W. R. FEE.
Car Spring.
No. 19,764.
Patented Mar. 30, 1858.
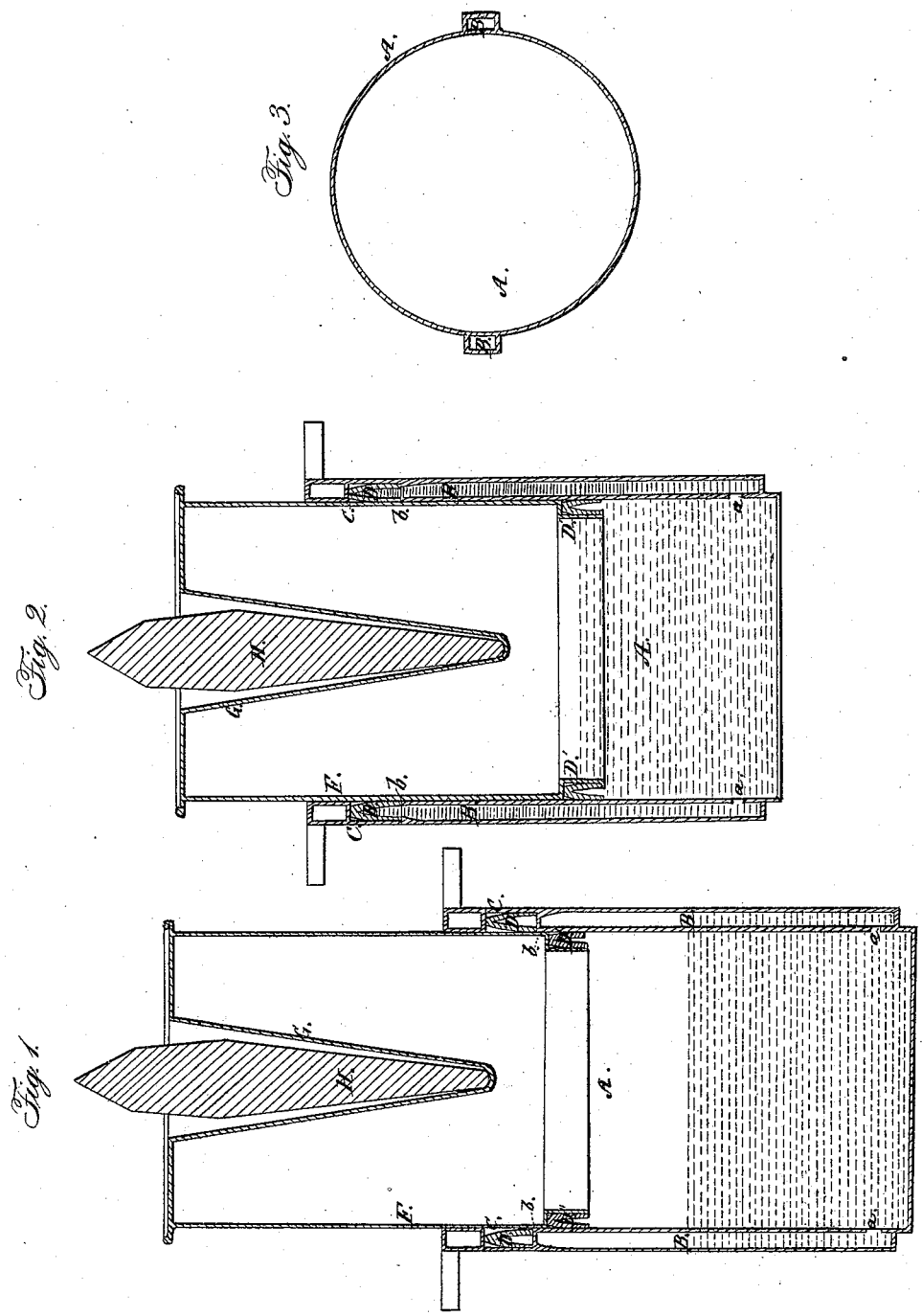

UNITED STATES PATENT OFFICE.

WM. R. FEE, OF CINCINNATI, OHIO.

PNEUMATIC SPRING.

Specification of Letters Patent No. 19,764, dated March 30, 1858.

*To all whom it may concern:*

Be it known that I, WM. R. FEE, of Cincinnati, in the county of Hamilton and State of Ohio, have invented certain new and useful Improvements in Pneumatic Springs; and I do hereby declare that the following is a full, clear, and exact description of the same, reference being had to the accompanying drawings, forming part of this specification, in which—

Figure 1, represents a vertical section of my spring with the piston just entering the cylinder. Fig. 2, is a similar section with the lips of the piston inserted in the oil or other lubricator with which the cylinder is partly filled, the piston being at its highest working point. Fig. 3, is a horizontal section of my cylinder showing the oil passages external to the cylinder proper.

My invention consists of a hollow piston for containing air, in combination with a hollow cylinder partially filled with oil or other lubricator, for the purpose of giving greater play to a pneumatic spring and preventing the possibility of either leakage or explosion.

In the accompanying drawings A, represents an air tight cylinder partially filled with oil or other lubricator as shown in broken lines.

F, is a hollow piston with its mouth inserted into the mouth of the cylinder.

D, and D', are leather packing rings which are always filled with oil as shown in Fig. 2. The oil is admitted to the upper ring by means of the passages B, through which it is forced by the action of the piston. In the top of the piston F, is a conical socket G into which is loosely inserted a supporter H. The weight rests upon this supporter but cannot produce any friction between the piston and cylinder. The piston is properly supported by lugs L. A small passage $b$, admits oil to lubricate the piston. By this arrangement it is impossible for any air to escape so long as the cylinder A, contains sufficient oil to fill the passages B. It is intended to keep oil enough in A, to allow the piston sufficient play without either striking the bottom of the cylinder or rising out of the oil. The quantity of air in the piston is so great as to render it impossible either to produce an explosion by compressing the air or to rupture the spring by driving the piston home.

This spring has been several months in use and has been tested with entire satisfaction as to its practicability and power. The friction of the piston is so slight and the elasticity of the spring so great that the truck of a rail road car upon rough roads will fall while the car bed does not follow as with other springs. The space economized by the use of this spring is of great importance upon rail road cars.

I am aware that a hollow piston has been used when connected with the cylinder by wide belts of india rubber or cloth, there being a large space between the cylinder and piston, but the strength of such springs depends upon the strength of the belts. On the contrary my spring is merely packed with leather and oil, and its strength is equal to the strength of the metal forming the cylinder and piston. Thus the elasticity of my spring is increased without any diminution of the strength of its walls.

Having thus fully described my invention, what I claim and desire to secure by Letters Patent of the United States is:

The above described pneumatic spring, having a hollow metallic piston working closely in a hollow metallic cylinder, and packed by leather and oil, for the purpose of increasing the elasticity of the spring and preventing explosions and leakage, the whole being constructed substantially as set forth.

WM. R. FEE.

Witnesses:
G. YORKE AT LEE,
EDM. F. BROWN.